United States Patent [19]

Soumiya et al.

[11] Patent Number: 5,761,217
[45] Date of Patent: Jun. 2, 1998

[54] METHOD FOR RECOVERING ERRORS WITH DATA COMMUNICATION

[75] Inventors: Kazuo Soumiya, Kyoto; Yasuyuki Murakami, Uji, both of Japan

[73] Assignee: Murata Kikai Kabushiki Kaisha, Kyoto, Japan

[21] Appl. No.: 678,790

[22] Filed: Jul. 11, 1996

[30] Foreign Application Priority Data

Jul. 26, 1995 [JP] Japan ................... 7-190706

[51] Int. Cl.⁶ ........................... H04N 1/00
[52] U.S. Cl. ........................... 371/30; 358/463
[58] Field of Search .................. 358/463; 371/30

[56] References Cited

U.S. PATENT DOCUMENTS

4,188,643  2/1980  Schayes et al. ............... 358/463
5,533,033  7/1996  Ratner ......................... 371/30

Primary Examiner—Stephen M. Baker
Attorney, Agent, or Firm—Armstrong, Westerman, Hattori, McLeland & Naughton

[57] ABSTRACT

Recovery of correct data is possible by correcting errors included in received data without using a special error correction control procedure. Error correction patterns Ea1-Ea5 and Eb1-Eb3 derived using the characteristics of the data modulation method are prepared in advance. These error correction patterns Ea1-Ea5 and Eb1-Eb3 are prepared corresponding to each of the data modulation methods. Then, when an error is detected in the received data, the error is corrected by applying the error correction pattern corresponding to the modulation method of that received data to the same data.

10 Claims, 10 Drawing Sheets

| TRI – BIT VALUE | PHASE CHANGE (DEGREES) |
|---|---|
| 0 0 1 | 0 |
| 0 0 0 | 4 5 |
| 0 1 0 | 9 0 |
| 0 1 1 | 1 3 5 |
| 1 1 1 | 1 8 0 |
| 1 1 0 | 2 2 5 |
| 1 0 0 | 2 7 0 |
| 1 0 1 | 3 1 5 |

| DI – BIT VALUE | PHASE CHANGE (DEGREES) |
|---|---|
| 0 0 | 0 |
| 0 1 | 9 0 |
| 1 1 | 1 8 0 |
| 1 0 | 2 7 0 |

| ERROR CORRECTION PATTERN FOR 4800 bps USE ||
|---|---|
| EA1 | 1 1 0 0 0 0 1 0 1 |
| EA2 | 1 0 1 0 0 0 1 1 1 1 |
| EA3 | 1 0 0 1 0 0 1 1 0 1 1 |
| EA4 | 1 0 0 0 1 0 1 1 0 0 1 1 |
| EA5 | 1 0 0 0 0 1 1 1 0 0 0 1 1 |

1...ERROR BIT, 0...CORRECT BIT

FIG. 7B

| ERROR CORRECTION PATTERN FOR 2400 bps USE ||
|---|---|
| EB1 | 1 1 0 0 0 0 1 0 1 |
| EB2 | 1 0 1 0 0 0 1 1 1 1 |
| EB3 | 1 0 0 1 0 0 1 1 0 1 1 |

1...ERROR BIT, 0...CORRECT BIT

FIG. 8A

```
0 1 0 0 1 1   ...CORRECT(A,B,C)
0 1 1 0 1 0   ...INCORRECT(A,Be,C)
―――――――――――
0 0 1 0 0 1   ...ERROR PATTERN
```
ERROR BIT     ERROR BIT

FIG. 8B

```
      0 0 0 0 0 0 0 0
       0 0 0 0 0 0 0 0
        1 0 0 0 0 0 1 1
         0 0 0 0 0 0 0 0
          0 0 0 0 0 0 0 0
XOR        1 0 0 0 0 0 1 1
―――――――――――――――――――――――
0 0 1 0 0 1 0 0 1 1 0 1 1  ...OUTPUT DATA FROM THE
                              DESCRAMBLER CIRCUIT
```
ERROR BIT

FIG. 9A
ERROR PATTERN OF TWO CONSECUTIVE TRI – BITS.(4800 BPS)

"1 0 0 1"
"1 0 1"
"1 1"          } 5 PATTERNS
"1 0 0 0 1"
"1 0 0 0 0 1"

FIG. 9B
ERROR PATTERN OF TWO CONSECUTIVE DI – BITS.(2400 BPS)

"1 0 1"
"1 1"          } 3 PATTERNS
"1 0 0 1"

PRECEDING LINE ······1 0 0 0 0 1 0|0 1 0 1 0 0 1 0 1 0 0 1 1 0 ······
ERROR LINE      ······1 0 0 0 0 1 0|1 1 0 0 1 0 1 1 1 1 0 1 1 0 ······
                                   ↦ PLACE OF PRESUMED ERROR

FIG. 13B

······ 1 1 0 0 1 0 1 1 1 1 0 1 1 0 ······ ERROR LINE
XOR    1 1 0 0 0 0 1 0 1                  ERROR CORRECTION
                                          PATTERN Ea1
------------------------------------------
······ 0 0 0 0 1 0 0 1 0 1 0 1 1 0 ······ CORRECTED LINE

FIG. 13C

······ 1 1 0 0 1 0 1 1 1 1 0 1 1 0 ······ ERROR LINE
XOR      1 1 0 0 0 0 1 0 1                ERROR CORRECTION
                                          PATTERN Ea1
------------------------------------------
······ 1 0 1 0 1 0 1 0 1 0 0 1 1 0 ······ CORRECTED LINE

METHOD FOR RECOVERING ERRORS WITH DATA COMMUNICATION

BACKGROUND OF THE INVENTION

1. Technical Field

The present invention relates to an error recovery method for data communication that corrects errors in received data and restores them to correct data.

2. Background Art

As a conventional error correction method for data communication, a method that detects and corrects errors in the received data using an error correction code (Forward Error Control system: FEC), or a method that requests the transmitting side to re-transmit the data when an error is detected in the received data (Automatic Report Request system: ARQ) has been known. On a facsimile device, error data included in the received image data can be corrected by using ECM (error correction mode) communication functions. In short, with this ECM communication, image data is partitioned into frames of a predetermined number of bits and transmitted. At the receiving side, when error data is detected in a received frame, a request to re-transmit the frame containing that error data is sent to the transmitting side. Consequently, the error is corrected by replacing the frame containing the error data with the re-transmitted frame.

However, on normal facsimile devices not provided with the above mentioned ECM communication functions, the image data is simply transmitted as coded data and even if error data is received, it cannot be corrected.

SUMMARY OF THE INVENTION

In order to solve the aforementioned problems, it is an object of the present invention to propose an error recovery method for data communication that can correct errors included in received data and recover correct data without using a special error correction control procedure.

In order to achieve the aforementioned object, a first aspect of the present invention prepares specific error correction patterns corresponding to the modulation method of the data in advance and when an error is detected in the received data, applies those error correction patterns corresponding to the modulation method of the received data to the same data and corrects the aforementioned error.

For data communication, the data is transmitted in a state modulated by a predetermined modulation method. And in some modulation method, generation pattern of the error may be specified corresponding to that method. This is why the first aspect of the present invention can prepare specific error generation pattern as error correction pattern in advance. According to this aspect, when an error is detected in the received data, as the error correction pattern corresponding to the modulation method of the received data is applied to the same data and the aforementioned error is corrected, there is no need for a special error correction control procedure.

That is, according to the first aspect of the present invention, recovery of correct data is possible by correcting errors included in the received data without using a special error correction control procedure such as ECM communication functions. As a result, a high quality printing image can be obtained. In addition, since there is no need to execute procedures deviating from normal facsimile communication procedures, the facsimile device remains easy to handle for everyone in spite of its enhanced abilities.

Furthermore, during the error correction described above, a second aspect of the present invention repeats a process that carries out a logical operation by applying a correction pattern to one part of one line of image data including error data and a process that determines whether that data which has been logically operated is an error line or not, with changing the location where the correction pattern is applied to the image data, and chooses one data from the data judged not to be an error line as correctly recovered line data.

According to the second aspect of the present invention, the process that carries out a logical operation by applying a correction pattern on one part of one line of image data including error data and a process that determines whether that data which has been logically operated is an error line or not, are repeated while the location where the correction pattern is applied to the image data is being changed. Then, one data from the data judged not to be an error line is chosen as correctly recovered line data. Due to this, error correction can be more reliably carried out.

Further, in the error line-judgment according to the second aspect above, a third aspect of the present invention carries out the determination of whether the data is an error line or not when the logically operated data is decoded to a white/black run length, depending on whether the total bit count of one line of picture element data attains a prescribed number or whether there is a prescribed code corresponding to the logically operated data.

According to the third aspect of the present invention, when there is a prescribed code that corresponds to the logically operated data (for example, a code defined by the MH (Modified Huffman)) when decoding, the data is judged not to be an error line, and when there is no such prescribed code, the data is judged to be an error line. Or when the logically operated data is decoded to a white/black run length, if the total bit count of one line of picture element data attains a prescribed value (for example, the data corresponding to A4 size paper is 1728 bits), the data is judged not to be an error line and when it does not attain a prescribed number, the data is judged to be an error line. In this way, judgment on whether or not it is an error line can be easily carried out by determining whether or not there is a prescribed code and whether or not the total bit count of the picture element data attains a prescribed number or not.

Further, the fourth aspect of the present invention provides the method with a plurality of the aforementioned correction patterns for one type of modulation method in which the logic operation processing is carried out using all of the correction patterns. In this way, error correction can be more reliably carried out.

Further, as the fifth aspect of the present invention, in one line of image data containing error data, data as far as the location where bit values are the same with respect to the preceding line data is regarded as correct data, while all that after the location where bit values are different is presumed to be an error location including error bits. And the error correction pattern is only applied to that estimated error location. Due to this, in comparison with when the error correction pattern is applied to all areas of the error line, the processing time may be shortened.

Further, as the sixth aspect of the present invention, a logical operation of the correction pattern on one part of one line of the image data which includes error data is carried out and then whether or not that logically operated data is an error line is judged. When the data is judged not to be an error line, that data is regarded as correctly restored line data and when the data is judged to be an error line, the location where the aforementioned correction pattern is applied to the image data is changed and processing of after the logic operation process is repeated. In this way, the processing time can be shortened.

Further, as the seventh aspect of the present invention, the error recovering device is provided with memory means for pre-memorizing error correction patterns prescribed corresponding to the modulation method of the data, detection means for detecting an error in the received data and a correction means correcting the aforementioned error by applying an error correction pattern corresponding to that modulation method of the received data to the same data when an error is detected. Herein ROM has memory means and the CPU includes detection means and correction means. In this way, correct data may be recovered by correcting errors included in the received data without using a special error correction control procedure.

DETAILED DESCRIPTION OF THE PREFERRED EMBODIMENTS

Below, an embodiment of the present invention realized in a facsimile device will be described based on the diagrams.

Figure 1:
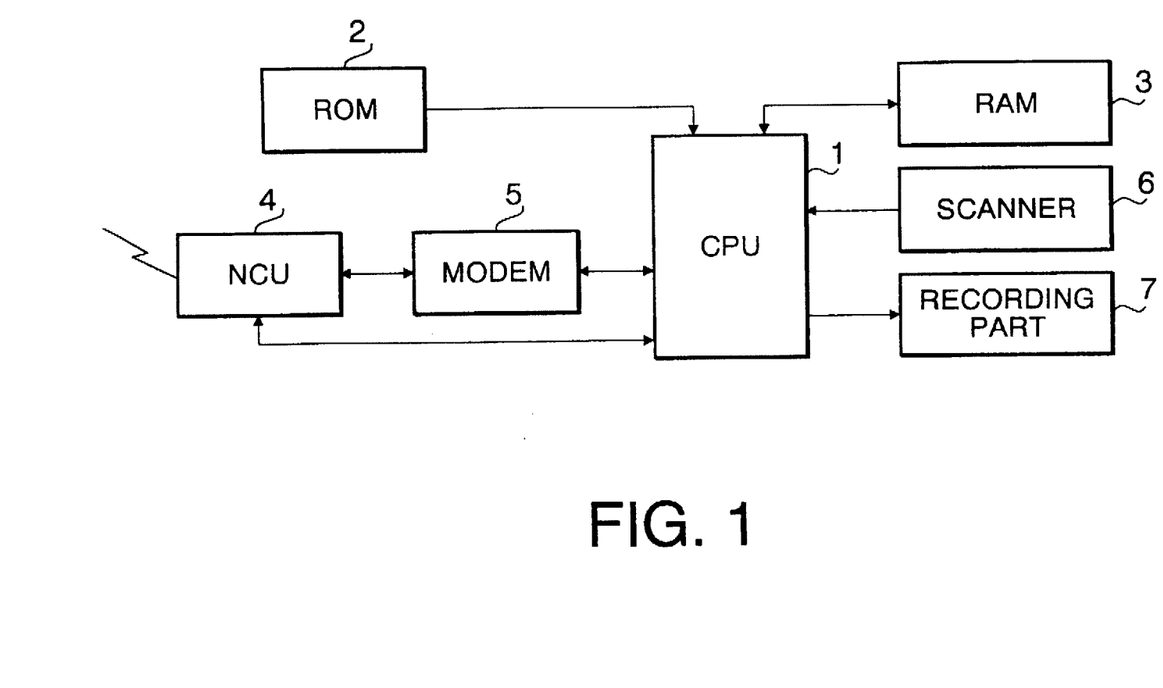
FIG. 1 is a circuit structure diagram of a facsimile device embodied in the present invention.

FIG. 1 shows a circuit structure of the facsimile device on the present embodiment. CPU (Central Processing Unit) 1 controls the operations of the entire facsimile device. ROM (Read Only Memory) 2 stores the programs and the like necessary for the operations of the CPU 1. RAM 3 temporarily memorizes various type of information of the received data and the like. NCU (Network Control Unit) 4 controls the connection to the telephone lines. Modem 5 carries out modulation of image data to be transmitted and demodulation of received image data. Scanner 6 scans an image of a document. Recording part 7 carries out printing on the recording paper based on the received image data and the like. The CPU 1 includes a coding/decoding means and codes image data to be transmitted and decodes received image data by a standard coding method such as an MH code.

The aforementioned modem 5 carries out modulation in accordance with a multi phase differentially encoded modulation method of recommendation V.27ter of the ITU-T (International Telecommunications Union). At a transmission rate of 4800 bps, an 8-phase differentially encoded modulation method (8-phase DPSK method) is used and at 2400 bps, a 4-phase differentially encoded modulation method (4-phase DPSK method) is used.

Figure 3:
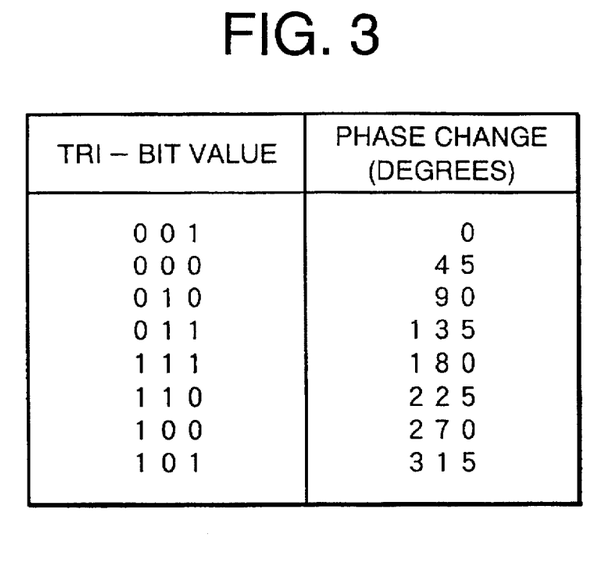
FIG. 3 is an explanatory diagram showing the tri-bit values and the phase change corresponding to them.
Figure 4:
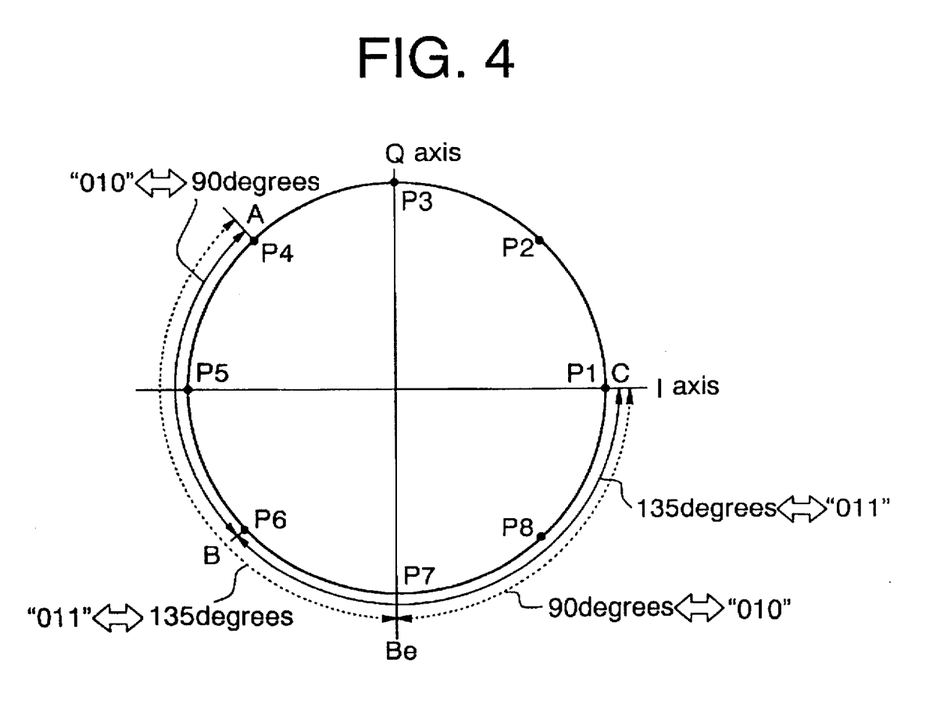
FIG. 4 is an explanatory diagram showing orthogonal co-ordinates for expressing the tri-bit values as phase changes.

Hereinafter, the previously mentioned multi phase differentially encoded modulation method will be described. This modulation method inserts breaks into the bit series being binary data every n bits and transmits that n bits of information according to changes of phase state of a constant amplitude carrier herein the phase state includes $N=2^n$ states. In actuality, as shown in FIG. 3, the image data bit series to be transmitted is partitioned into groups every three consecutive bits (below,called tri-bits) at the transmission side modem 5 by the 8-phase differentially encoded modulation method. The phase change of the carrier corresponding to the value of each tri-bit is pre-determined. FIG. 4 is a signal space diagram for expressing the value of each tri-bit as a phase change of the carrier and the 8 points P1 to P8 every 45 degrees on this signal space diagram are the points showing the phases. Also, the value of each of the aforementioned tri-bits are expressed as phase changes of the carrier at co-ordinate points P1 to P8.

For example, in FIGS. 3 and 4, suppose the current tri-bit value B is "010" and the preceding tri-bit value A is shown as co-ordinate point P4. In this case, as the phase change corresponding to the "010" tri-bit value B is 90 degrees, this "010" tri-bit value B is shown as point P6 which is advanced from the preceding point P4 by a 90 degree phase. Also, when the next tri-bit value C is "011", as the phase change corresponding to that tri-bit value C is 135 degrees, this "011" tri-bit value C is expressed as point P1 which is advanced from the preceding point P6 by a 135 degree phase. The carrier is then phase modulated and transmitted using a sin-wave or cosin-wave based on the co-ordinate points expressing the tri-bit values or, rephrased, the co-ordinate points expressing the phase changes.

Conversely, at the reception modem 5, when the aforementioned modulated signal is received, a demodulation of the modulated signal is carried out by procedures in reverse to those on the transmitting side. In short, the modulated signal is demodulated using a sin or cosin wave and expressed as one of co-ordinate points P1 to P8 shown in FIG. 4. Next, the phase change of the current point with respect to the preceding point is determined and the value of the tri-bit corresponding to that phase change is determined in accordance with FIG. 3. Then, this determined tri-bit is output as a bit series.

As an example with FIGS. 3 and 4, suppose, as a result of demodulation of the received modulated signal, point B expressing that modulated signal is at co-ordinate point P6 and point A expressing the preceding modulated signal is co-ordinate point P4. In this case, as the phase change of point B with respect to the preceding point A is 90 degrees, the value of the tri-bit corresponding to this 90 degree phase change is determined as "010" from FIG. 3. Also, when point C expressing the next modulated signal is co-ordinate point P1, as the phase change of point C with respect to the preceding point B is 135 degrees, the value of the tri-bit corresponding to this 135 degree phase change is determined to be "011" from FIG. 3.

Figure 5:
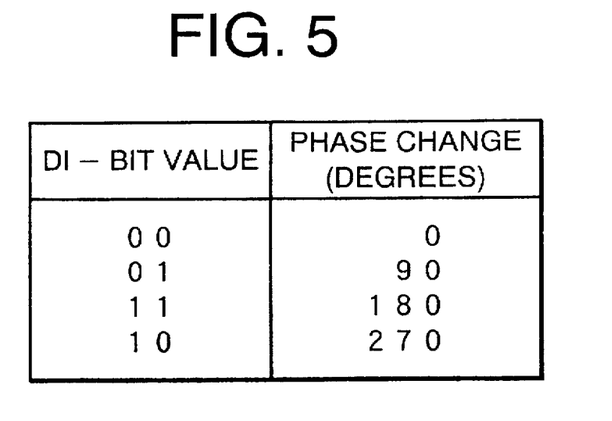
FIG. 5 is an explanatory diagram showing the di-bit values and the phase change corresponding to them.
Figure 6:
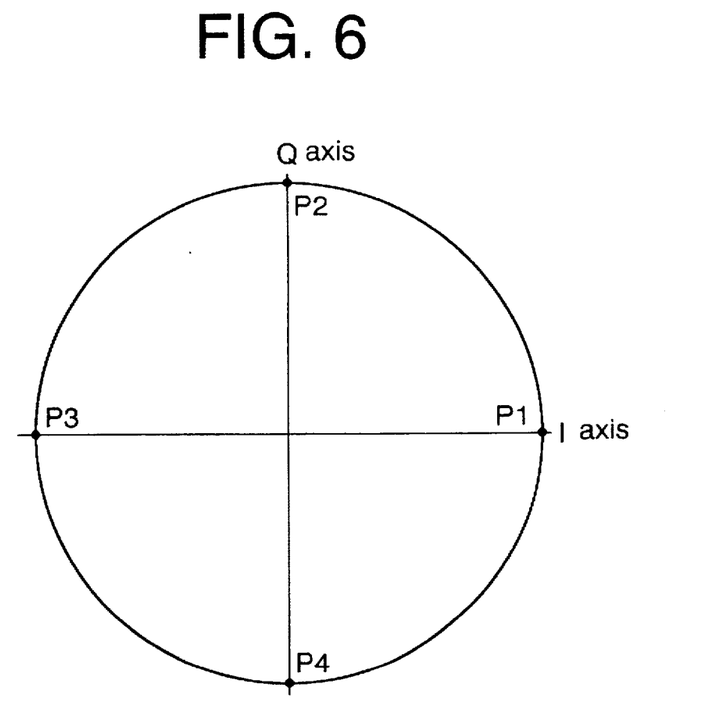
FIG. 6 is an explanatory diagram showing orthogonal co-ordinates for expressing the tri-bit values as phase changes.

Next, with the 4-phase differentially encoded modulation method, the image data bit series to be transmitted is partitioned into groups every two consecutive bits (below, called di-bits) at the transmission side modem 5 as shown in FIG. 5. The phase change of the carrier corresponding to each di-bit value is pre-determined. FIG. 6 is a signal space diagram for expressing the value of each di-bit as a phase change of the carrier and the 4 points P1 to P4 every 90 degrees on this signal space diagram are the points showing the phases. Also, the value of each of the aforementioned di-bits are expressed as phase changes of the carrier at co-ordinate points P1 to P4 as the value of each of the aforementioned tri-bits are expressed at co-ordinate points P1 to P8 by the 8 phase differentially encoded modulation method. The carrier is phase modulated and transmitted using a sin-wave or cosin-wave based on the co-ordinate points expressing the di-bit values.

Also, at the modem 5 of the receiving side, demodulation of the received modulated signal is carried out similar to the case using the aforementioned 8-phase differentially encoded modulation method. In short, the modulated signal is demodulated using a sin or cosin wave and expressed as one of co-ordinate points P1 to P4 shown in FIG. 6. Next, the phase change of the current point with respect to the preceding point is determined and the value of the di-bit corresponding to that phase change is determined in accordance with FIG. 5. Then, this determined di-bit is output as a bit series.

Figure 2:
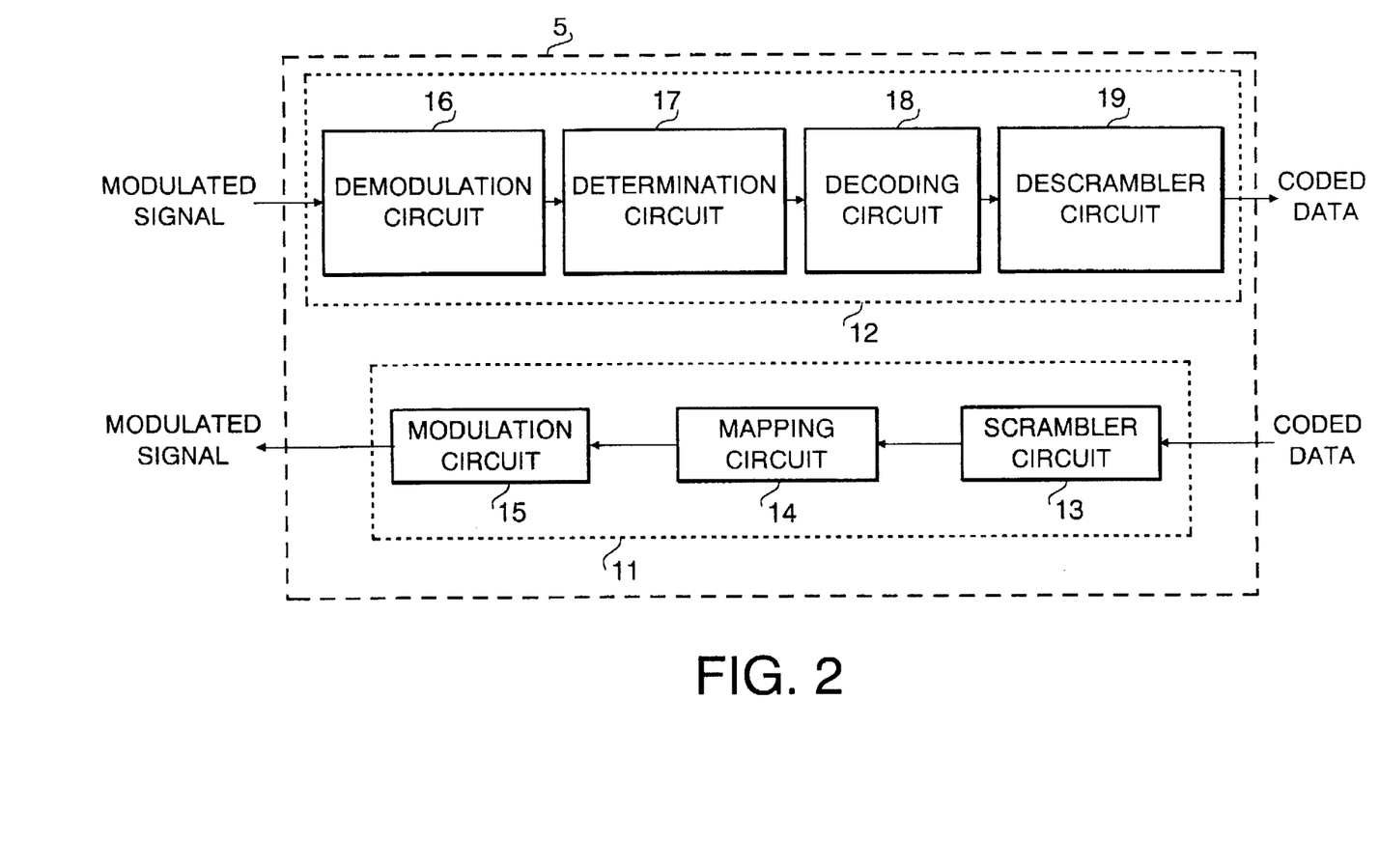
FIG. 2 is a circuit structure diagram of the modem.

Next, the structure of the aforementioned modem 5 will be described in detail. As shown in FIG. 2, the modem 5 includes transmission circuit 11 and reception circuit 12. Firstly, the transmission circuit 11 will be described. A scrambler circuit 13 has a function for protecting multiple bit repetition patterns and when the coded scanned image data is input one bit at a time, that input image data is divided using the polynomial "$1+X^{-6}+X^{-7}$" and output to the mapping circuit 14, 1 bit at a time. For example, the phase change of the carrier corresponding to the values of the tri-bit "001" and di-bit "00" in the aforementioned FIGS. 3 and 5 is 0 degrees. Accordingly, when this "001" tri-bit and "00" di-bit values are continuously modulated, the carrier phase is not changed, and this may cause loss of synchronicity of the transmitted data during transmission and reception. In order to evade this kind of problem, the scrambler circuit 13 reverses each "0.1" of each bit of the input image data in accordance with the aforementioned polynomial and outputs it in a scrambled state.

The mapping circuit 14 breaks the bit sequence input from the scrambler circuit 13 into tri-bits or di-bits corresponding to the transmission speed of the data. Then the mapping circuit 14 determines the phase change of the carrier corresponding to the value of the aforementioned tri-bit or di-bit in accordance with the data pre-memorized in the ROM 2 as shown in FIGS. 3 and 5, and decides which of co-ordinate points P1 to P8 as shown in FIG. 4 or FIG. 6 refers to that phase change. Based on the co-ordinate point decided by the mapping circuit 14, the modulation circuit 15 phase modulates the carrier using a sin or cosin wave and transmits it to the telephone lines via the NCU 4.

Next, the reception circuit 12 will be described. Demodulation circuit 16 demodulates the image data as a modulation signal received via the NCU 4 using a sin and cosin wave corresponding to that transmission speed and expresses it as coordinate points as shown in FIG. 4 or 6. Determination circuit 17 decides which of the 8 coordinate points P1 to P8 or 4 co-ordinate points P1 to P4 is that point. Decoding circuit 18 determines the phase change with respect to the preceding point based on that decided point, determines the tri-bit or di-bit value corresponding to that phase change in accordance with the data shown in FIG. 3 or 5 of in the ROM 2, and outputs it to the descrambler circuit 19 as a bit sequence. In order to return the data processed by the transmission side scrambler circuit to it's original state, when the bit sequence is input one bit at a time into the descrambler circuit 19, the input data is multiplied using the polynomial "$1+X^{-6}+X^{-7}$" and output one bit at a time. Then the output data from this descrambler circuit 19 is memorized in the RAM 3 as coded data such as MH code.

The aforementioned CPU 1 decodes the coded data in the RAM 3 to a white/black run length and outputs it to the recording part 7 one line at a time as image data. At this point, the CPU 1 judges whether the decoded line data is an error line or not. When the coded data is decoded, this judgment is carried out depending on whether that coded data exists in code defined by the MH code, or whether, as a result of decoding one line of coded data, the total of the run length, in other words, the total bit count of picture element data of one line, attains a prescribed count (for example, 1728 bit when the data corresponds to A4 size) or not. Thus whether or not there is an error line can easily be judged based on whether or not the total bit count of the picture element data in the decoded line has reached a prescribed number or not or whether there is a prescribed code corresponding to the coded data.

Figure 7A:
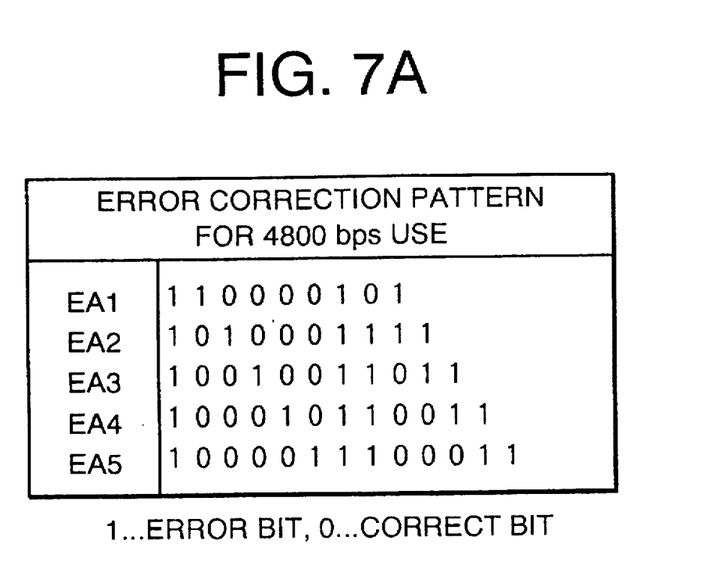
FIG. 7A is an explanatory diagram showing the error correction pattern used for 4800 bps.
Figure 7B:
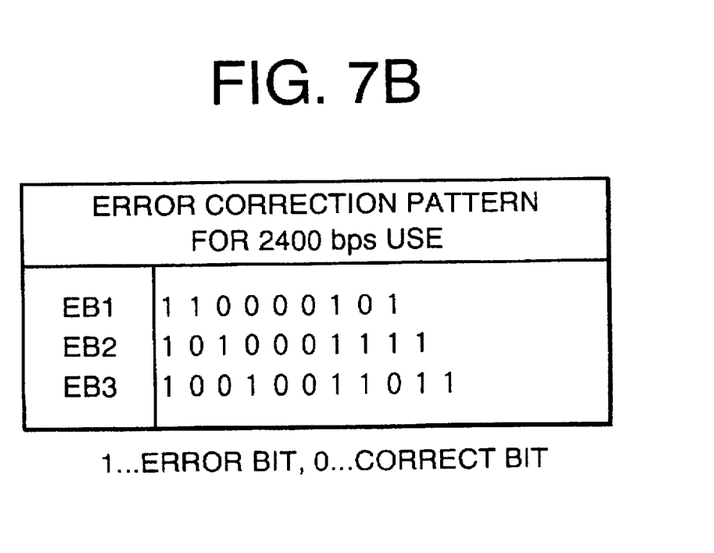
FIG. 7B is an explanatory diagram showing the error correction pattern used for 2400 bps.

Also, in the present embodiment, the CPU 1 includes an error recovery means. When an error line is detected during decoding of the aforementioned coded data, the error recovery means corrects the error line and recovers the correct line data. In concrete terms, data of error correction patterns as shown in FIG. 7A/B are pre-memorized in the ROM 2. The 5 error correction patterns Ea1–Ea5 shown in FIG. 7A are used for when the data transmission rate is 4800 bps and the 3 error correction patterns Eb1–Eb3 shown in FIG. 7B are used for when the data transmission rate is 2400 bps. Furthermore, the CPU 1 carries out correction of the error line using these error correction patterns Ea1–Ea5/Eb1–Eb3.

These error correction patterns Ea1–Ea5 and Eb1–Eb3, are derived using the characteristics of the multi-phase differentially encoded modulation from ITU-T recommendation V.27ter. In short, the value of the tri-bit or di-bit shown in FIGS. 3 and 5 is set so that, when consecutive bits are compared, they only differ from each other by 1 bit. For example, in FIG. 3, the value of the tri-bit corresponding to a 90 degree phase change is "010", the value of the tri-bit corresponding to the adjacent 135 degree phase change is "011" and the difference between both values is the one bit of the last digit.

Also, on present telephone lines, there is very little disruption of the transmitted carrier. Therefore, transmission error does not occur with that great a frequency and the error rate is of the proportion of 1 location per one line of data. Moreover, there is little displacement of the phase of the co-ordinate points determined by the received modulation signal and the displacement is of the level where it is mistaken for the next point (±45 degrees for 4800 bps, ±90 degrees for 2400 bps). For example, in the case shown in the aforementioned FIG. 4, it is of the level where point B is mistaken for adjacent points P7 or P5 being displaced by 45 degrees with respect to the correct point P6.

Furthermore, in this case shown in FIG. 4, supposing the aforementioned point B was mistaken for co-ordinate point P7 due to a transmission error. If this mistaken point is Be, as the phase change of the point Be with respect to the preceding point A is 135 degrees, the value of the tri-bit corresponding to this 135 degree phase change is determined as "011" from FIG. 3. Also, as the phase change of next point C with respect to point Be is 90 degrees, the value of the tri-bit corresponding to this 90 degree phase change is determined as "010" from FIG. 3. In short, in recommendation V.27ter, as the value of a tri-bit is determined based on the phase change of the next point with respect to the preceding point, as made clear from FIG. 4, if the phase change of one point is displaced, the two tri-bits that sandwich this displaced point and are determined according to the displaced point, become mistaken. This is similar to the case shown in FIG. 6 concerning a transmission rate of 2400 bps. If the phase of one point is displaced, the values of two di-bits which sandwich this displaced point and are determined according to the displaced point, are mistaken.

Figure 8A:
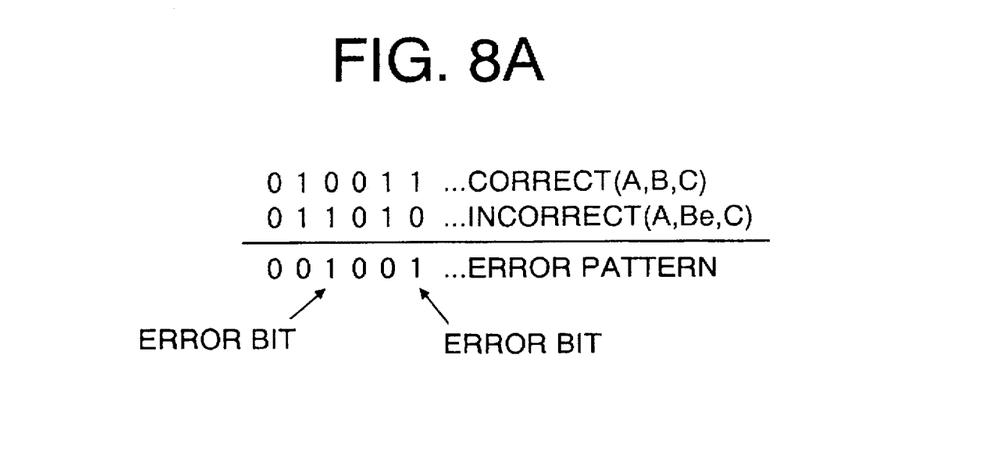
FIG. 8A is an explanatory diagram showing the bit error generated at two successive tri-bits.

In conclusion, the adjacent values of the tri-bit or those of the di-bit only differ by 1 bit from each other. The co-ordinate point determined by the received modulation signal is mistaken of the level where it is mistaken for an adjacent point. Consequently, if one co-ordinate point is mistaken, the two consecutive tri-bits or di-bits determined to be either side of that mistaken point are each mistaken by one bit. For example, in the case shown in FIG. 4, if points A, B and C erroneously become points A, Be and C, a 1 bit error is generated in each of 2 consecutive tri-bits as shown in FIG. 8A and in total a 2 bit error is generated.

Figure 8B:
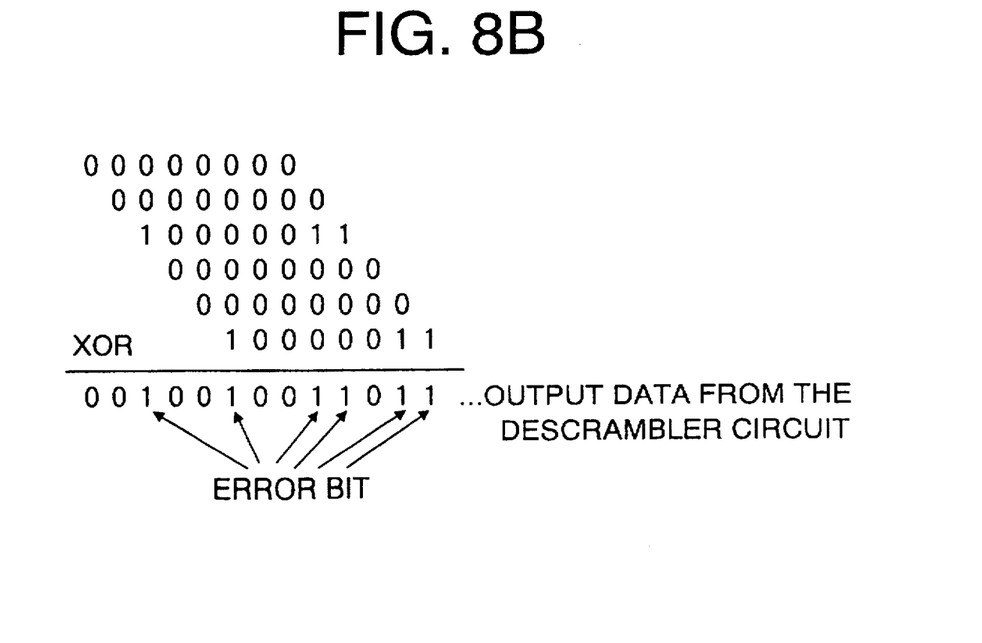
FIG. 8B is an explanatory diagram showing the data resulting from processing the error pattern at (a) at the descrambler circuit.

This bit error is also influenced by the processing of the descrambler circuit 19. In short, multiplication is carried out using three term polynomials such as "1+X$^{-6}$+X$^{-7}$" on the input data in the descrambler circuit. Therefore, the erroneous one bit data becomes a mistake of 3 bits and is output. For example, in the above mentioned FIG. 8A, suppose "001001" (1 indicates the error bit) is the data of the error pattern. When the data of this error pattern is processed in the descrambler circuit 19, the output of the same descrambler circuit 19 becomes "0010010011011" as shown in FIG. 8B and the input data including 2 error bits is output as data including 6 error bits. It should be noted that multiplication by this descrambler circuit 19 is multiplication using Exclusive OR.

As described above, with recommendation V.27ter, one co-ordinate point mistake is output as 6 bits mistakes. As the transmission error rate is at most of the proportion of one location in one line data, there are a maximum of 6 bits of transmission error per one line data.

Figure 9A:
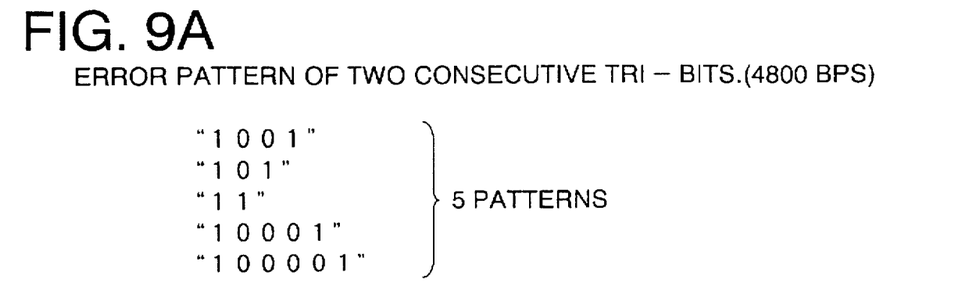
FIG. 9A is an explanatory diagram showing the error pattern at two successive tri-bits.
Figure 9B:
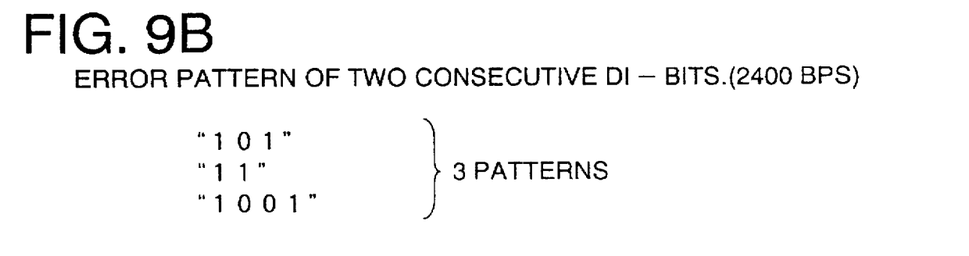
FIG. 9B is an explanatory diagram showing the error pattern at two successive di-bits.
Figure 10A:
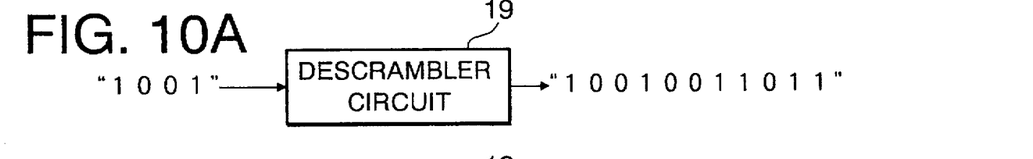
FIG. 10A–FIG. 10E are explanatory diagrams showing the data resulting from processing each of the error patterns in FIG. 9A at the descrambler circuit.
Figure 10B:
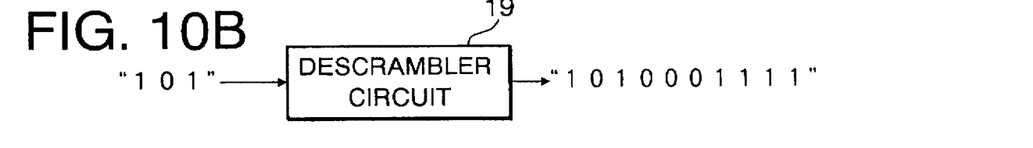
Figure 10C:
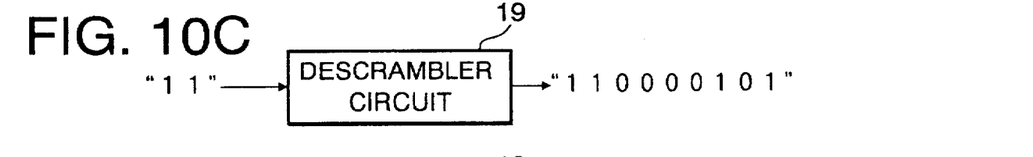
Figure 10D:
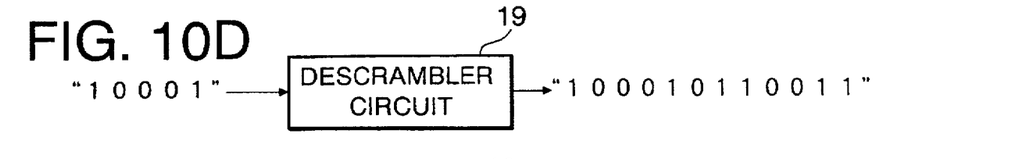
Figure 10E:
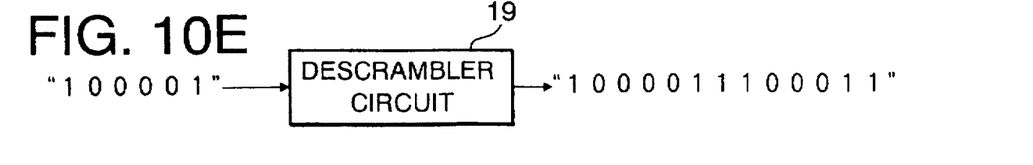

Moreover, the above mentioned error pattern is restricted to the 5 patterns when the transmission rate of data is 4800 bps and 3 patterns in the case of 2400 bps. In short, as mentioned previously, when one co-ordinate point is mistaken, the two values of the tri-bit or di-bit that are determined to be either side of that mistaken point are mistaken by one bit each. Accordingly, the error pattern of the two consecutive tri-bit or di-bit is limited to the pattern as shown in FIG. 9A and FIG. 9B. It should be stated that in the same diagram, "0" indicates the correct bit and "1" indicates the error bit.

As shown in FIG. 10A–FIG. 10E, when the data of these error patterns is processed in descrambler circuit 19 similar to the aforementioned FIG. 8B, the data of the error patterns shown on the right of FIG. 10A–FIG. 10E is obtained. It should be stated that, as the three error patterns in the case of 2400 bps are included in the 5 error patterns for the case of 4800 bps, duplicated error patterns are not illustrated. In short, for recommendation V.27ter, when an error exists in the data obtained by demodulating one line of received image data, it can be presumed that the error included in that one line's worth of data can virtually always be expressed with one of the error patterns shown in these FIG. 10A–FIG. 10E.

Consequently, when an error line is detected in the received data, one of the error patterns shown in FIG. 10A–FIG. 10E is applied to the error location in that error line and if the "0, 1" of the bit corresponding to the "1" of that error pattern is reversed, the error line can be restored to a correct line.

From the above, in the present embodiment, these error patterns shown in FIG. 10A–FIG. 10E are used as error correction patterns Ea1–Ea5/Eb1–Eb3 as shown in FIG. 7A and FIG. 7B.

Next, the operations of a facsimile device structured as above will be described.

Figure 11:
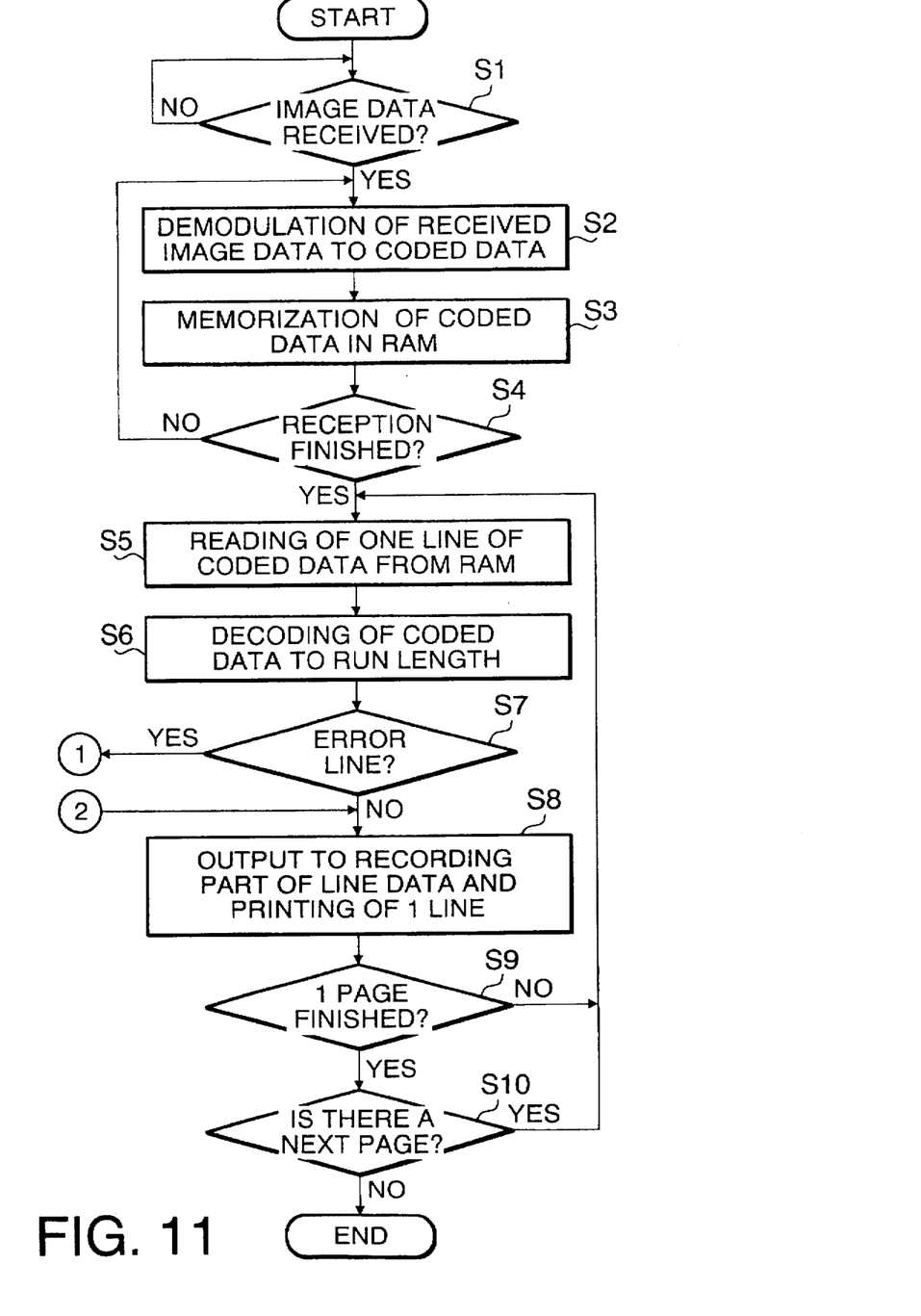
FIG. 11 is a flow chart showing the operations during reception.
Figure 12:
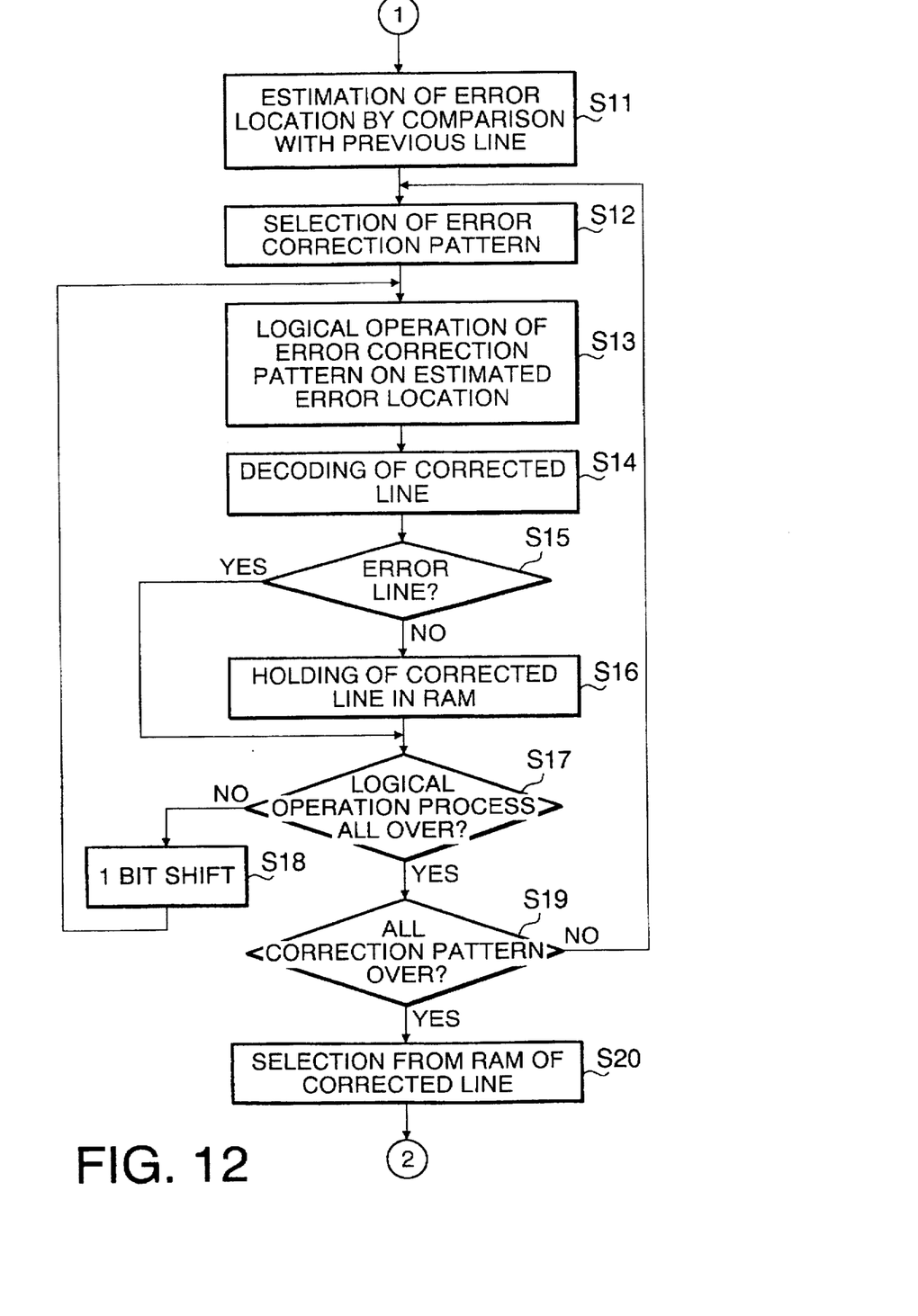
FIG. 12 is a flow chart showing the operations during reception.

When this facsimile device receives a signal, operations as shown in the flow charts of FIGS. 11 and 12 are carried out under the control of the CPU 1. It should be stated these communication operations are carried out in accordance with recommendation V.27ter. First, as shown in FIG. 11, when image data is received as a modulation signal, that received image data is sequentially demodulated to coded data such as MH code in the modem 5 and that coded data is sequentially memorized in the RAM 3 (steps S1–S3). When reception of the image data is complete, one line of the coded data in the RAM 3 is read out and decoded to a white/black run length (steps S4–S6). Then, judgment is carried out of whether that decoded line data is an error line or not (step S7). If it is not an error line, that line data is output as image data to the recording part 7 and printing of that one line is carried out on recording paper at the aforementioned recording part 7 (step 8).

Next, judgment is carried out of whether the printing of one page is complete or not(step S9). When not complete, the operations are returned to step S5 and when complete, judgment of whether there is another page of coded data in the RAM 3 or not is carried out (step S10). Then, when there is another page of coded data, the operations are returned to step S5. When there is no next page, the processing is completed.

Figure 13A:
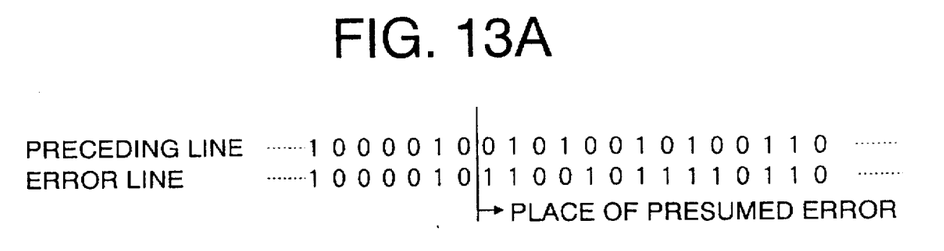
FIG. 13A is an explanatory diagram showing the processing of estimated errors in the error line.

However, at step S7, when the decoded line data is an error line, that error line and the line data preceding the error line are compared and the error location in the error line is estimated (step S11). The estimation of this error location is carried out by comparison of the error line and that preceding line data one bit at a time from the start of the coded data before decoding, as shown in FIG. 13A for example. Then, in the error line, data as far as the location where bit "0,1" is the same with respect to the preceding line data is regarded as correct data and all that after the location where bit "0,1" is different is presumed to bean error location including error bits.

Next, predetermined correction pattern data is selected from among the error correction pattern data in the ROM 2 as shown in FIG. 7A and FIG. 7B (step S12). Although not shown in the flow chart, whether the transmission speed of the data is 4800 bps or 2400 bps has already been recognized based on the exchange of facsimile control procedure signals, such as DIS signals and DCS signals, carried out between the transmission side and reception side before the start of image data reception. Then, when the data transmission speed is recognized as 4800 bps, one certain correction pattern of data is selected from among the 5 error correction pattern data Ea1–Ea5 shown in FIG. 7A.

Figure 13B:
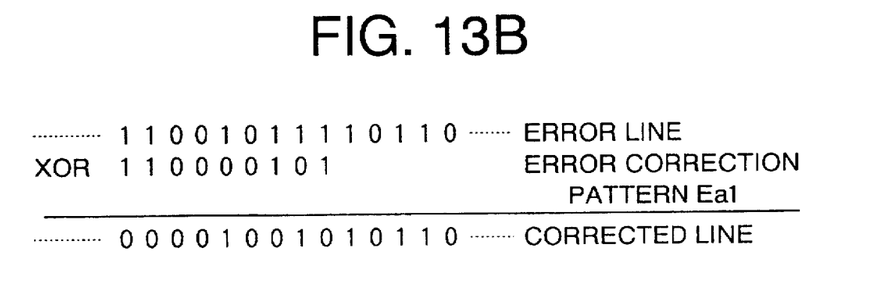
FIG. 13B and FIG. 13C are explanatory diagrams respectively showing the error correction processing using the error correction pattern.

Then, a logic operation of the aforementioned selected error correction pattern is carried out on the previously estimated error location in the error line (step S13). Concretely, supposing correction pattern Ea1 of FIG. 7A has been selected as the error correction pattern, as shown in FIG. 13B, an exclusive OR (XOR) operation is carried out on both data in the state where the leading bit of the error correction pattern Ea1 corresponds to the leading bit of the estimated error location in the error line. Due to this, in the error line, the bit "0,1" corresponding to the "1" of the error correction pattern Ea1 is reversed and as a result, corrected line data is obtained.

Next, the previously obtained corrected line data is decoded to a run length (step S14). Then, judgment is carried out of whether that decoded corrected line data is an error line or not (step S15). If judged not to be an error line, in order to maintain this decoded corrected line data as one example of correct line data, the same corrected line data is memorized in the RAM 3 (step S16) and the operations are advanced to step S17. When the corrected line data is judged to be an error line, the operations proceed onto step S17.

Figure 13C:
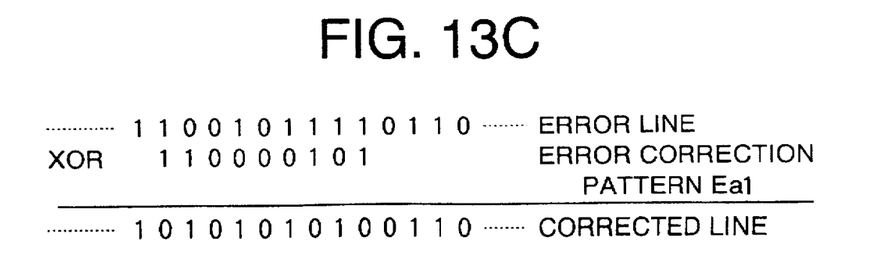

Then, at step S17, judgment of whether the logic operation processing of the aforementioned step S13 with respect to the estimated error location in the error line has completely finished or not is carried out. When not finished, the error correction pattern is again applied to the estimated error location in the error line but herein the application site is shifted by one bit (step S18) as shown in FIG. 13C, the operations are returned to the aforementioned step S13 and a logical operation processing is carried out once again. Then, when all the logical operation processing using the particularly selected error correction pattern (Ea1, for example) has been completed in the estimated error location in the error line, judgment of whether or not the logical operation processing of step S13 is complete using all the error correction patterns is carried out (step S19).

When not complete, the operations are returned to step S12 and data of another correction pattern is chosen from the data of the error correction patterns in the ROM 2. For example, when the data transmission speed is 4800 bps, data of one of the predetermined error correction patterns not yet used in the logical operation process is selected from the data of the 5 error correction patterns Ea1–Ea5 shown in FIG. 7A. Then, when a logical operation process using all of the error correction patterns is complete, one corrected line data is selected from the corrected line data memorized in the RAM 3 (step S20). Then, the operations move to step S8 of the aforementioned FIG. 11 and that corrected line data selected above is output to the recording part 7 as correctly restored line data.

It should be noted that, when the corrected line data obtained by a logical operation of a predetermined error correction pattern with respect to the prescribed estimated error location on the error line is judged not to be an error line, that corrected line data may be output at once to the recording part 7 as correctly restored line data. If this is done, it is possible to shorten processing time. However, in reality, corrected line data judged not to be an error line may be obtained not only when a prescribed error correction pattern has been logically operated with respect to a prescribed estimated error location in an error line, but also when the location where the error correction pattern is applied is changed or when the error correction pattern to be applied is changed. Due to this, in the present embodiment, logical operation processing of step S13 is carried out with respect to all of the estimated error locations in the error line using all of the error correction patterns as shown in the aforementioned flowchart. Then, for each of all the corrected line data obtained by this logical operation processing, judgment of whether it is an error line or not is carried out. When there is a plurality of corrected line data judged not to be error lines, the one thought to be the most suitable is selected from among these. As a result, it is possible to carry out error correction more reliably. As for the criteria on the selection above, for example, the corrected line data most closely resembling the preceding line data may be selected.

There are also cases when all of the corrected line data obtained by logical operation processing is judged to be error lines. In this case, although not shown in the flow chart, normal error processing, processing such as printing of the preceding line data in location of the error line, is carried out.

It should be noted that the present invention may be realized with the following changes.

(1) When correcting an error line, after all the error correction patterns have been applied to the prescribed estimated error locations in that error line, the error correction patterns are again applied to the estimated error location in the error line but with one bit shift of the application site this time. By doing this, an effectiveness similar to the aforementioned embodiment is obtained.

(2) When correcting an error line, an error correction pattern may be applied to all of the locations in the error line without estimating the error location.

(3) Even with other encoded modulation methods than 4 and 8 phase differentially encoded modulation methods, error correction can be executed by preparing error correction patterns similar to the aforementioned embodiment. This error correction can also be realized in modulation methods apart from these above such as a quadrature amplitude modulation (QAM) method (found in ITU-T recommendation V.29).

(4) A special hardware circuit for carrying out the error correction processing of the aforementioned embodiment may be arranged.

(5) Apart from data communication on a facsimile device, the present invention may also be realized for data communication of a computer using a FAX modem.

(6) Judgment of an error line may be performed by a parity check or CRC check.

What is claimed is:

1. An error recovery method for data communication, comprising the steps of:

preparing error correction patterns that are prescribed corresponding to modulation method of the data; and when an error is detected in received data, applying the error correction patterns corresponding to the modulation method of the received data to the same data thus correcting the error, wherein a process that carries out a logical operation by applying the error correction pattern to one part of one line of image data including error data and a process that determines whether logically operated data is an error line or not are repeated while the location where the correction pattern is applied to the image data is changed, and one data is chosen as correctly recovered line data from among the data determined not to be an error line, and wherein, in one line of image data containing error data, data as far as the location where bit values are the same with respect to preceding line data is regarded as correct data and all that after the location where bits are different is estimated to be an estimated error line including error bits, and the correction pattern is only applied to the estimated error line.

2. The error recovery method for data communication as in claim 1, wherein, when the logically operated data is decoded into a black/white run length, determination of whether or not one line of data is an error line is carried out depending on whether the total bit count of one line of picture element data is the same as a predetermined count or whether there is a predetermined code corresponding to the logically operated data.

3. The error recovery method for data communication as in claim 1, wherein there are a plurality of the correction patterns corresponding to one type of modulation method and the logic operation process is carried out using all of the correction patterns.

4. The error recovery method for data communication as in claim 1, wherein a logical operation is carried out by applying the error correct pattern to one part of one line of image data including error data, followed by determination of whether the logically operated data is an error line or not, and when the data is judged to not be an error line, it is presumed that data is correctly recovered line data and when the data is judged to be an error line, the locations where said correction pattern are applied to the image data are changed and a processes after the logic operation are repeated again.

5. An error recovery method for data communication, comprising the steps of:

preparing error correction patterns that are prescribed corresponding to modulation method of the data; and when an error is detected in received data, applying the error correction patterns corresponding to the modulation method of the received data to the same data thus correcting the error, wherein when an error data is corrected, after all the error correction patterns have been applied to one part of one line of image data including error data, the error correction patterns are again applied to the part of the line of image data but the application site is shifted one bit from the previous application site.

6. The error recovery method for data communication as in claim 5, wherein a process that carries out a logical operation by applying the error correction pattern to one part of one line of image data including error data and a process that determines whether logically operated data is an error line or not are repeated while the location where the correction pattern is applied to the image data is changed, and one data is chosen as correctly recovered line data from among the data determined not to be an error line.

7. The error recovery method for data communication as in claim 5, wherein, when the logically operated data is decoded into a black/white run length, determination of whether or not one line of data is an error line is carried out depending on whether the total bit count of one line of picture element data is the same as a predetermined count or whether there is a predetermined code corresponding to the logically operated data.

8. The error recovery method for data communication as in claim 5, wherein there are a plurality of correction patterns corresponding to one type of modulation method and the logic operation process is carried out using all of the correction patterns.

9. The error recovery method for data communication as in claim 5, wherein, in one line of image data containing error data, data as far as the location where bit values are the same with respect to preceding line data is regarded as correct data and all that after the location where bits are different is estimated to be an estimated error line including error bits, and the correction pattern is only applied to the estimated error line.

10. The error recovery method for data communication as in claim 5, wherein a logical operation is carried out by applying the error correct pattern to one part of one line of image data including error data, followed by determination of whether the logically operated data is an error line or not, and when the data is judged to not be an error line, it is presumed that data is correctly recovered line data and when the data is judged to be an error line, the locations where said correction pattern are applied to the image data are changed and processes after the logic operation are repeated again.

* * * * *